United States Patent
Chen

(10) Patent No.: US 9,884,271 B2
(45) Date of Patent: Feb. 6, 2018

(54) FILTER STRUCTURE

(71) Applicant: Szu-Ying Chen, Beidou Township, Changhua County (TW)

(72) Inventor: Szu-Ying Chen, Beidou Township, Changhua County (TW)

(*) Notice: Subject to any disclaimer, the term of this patent is extended or adjusted under 35 U.S.C. 154(b) by 398 days.

(21) Appl. No.: 14/788,793

(22) Filed: Jul. 1, 2015

(65) Prior Publication Data

US 2017/0001130 A1   Jan. 5, 2017

(51) Int. Cl.
*B01D 29/46* (2006.01)
*B01D 24/12* (2006.01)
*B01D 24/46* (2006.01)

(52) U.S. Cl.
CPC .......... *B01D 24/12* (2013.01); *B01D 24/46* (2013.01); *B01D 24/461* (2013.01); *B01D 24/4631* (2013.01); *B01D 24/4673* (2013.01); *B01D 24/4694* (2013.01)

(58) Field of Classification Search
None
See application file for complete search history.

(56) References Cited

U.S. PATENT DOCUMENTS

| | | | | |
|---|---|---|---|---|
| 293,747 | A * | 2/1884 | Hyatt | B01D 24/005 210/271 |
| 2,880,874 | A * | 4/1959 | Ferrara | B01D 24/205 210/272 |
| 3,292,788 | A * | 12/1966 | Schwartz | B01D 24/14 210/272 |
| 7,097,766 | B2 * | 8/2006 | Moya | B01D 24/14 210/272 |
| 9,149,746 | B2 * | 10/2015 | Choi | B01D 39/02 |

* cited by examiner

*Primary Examiner* — Thomas M Lithgow

(57) ABSTRACT

A filter structure has a main body and a stirring member. The main body has a hollow containment space filled with a filtering material. A filtering mesh is disposed at a bottom side of the containment space. A first purifying opening is disposed at a top end of the main body. A second purifying opening is disposed at a lower sidewall position of the main body above the filtering mesh. A first cleaning opening and a second cleaning opening are disposed on the main body and respectively coupled to a first and second inner pipe. An outlet is disposed at a bottom of the main body. The stirring member has an upper cover corresponding to the first purifying opening of the main body. The upper cover further has a driving arm and a connecting rod, and the connecting rod has a plurality of stirring rods.

10 Claims, 7 Drawing Sheets

FILTER STRUCTURE

BACKGROUND OF THE INVENTION

Field of the Invention

The present invention relates to a filter structure, and more particularly to a water filter structure.

Description of the Related Art

Currently, the quality of our daily use water is an important issue for us. However, most water distribution systems cannot guarantee the final quality of their supplied water for various reasons.

Therefore, it is desirable to provide a water filter structure for each household to mitigate and/or obviate the aforementioned problems.

SUMMARY OF THE INVENTION

An objective of embodiments of the present invention is to provide a water filter structure for household use, which can improve the quality of daily water supply.

In order to achieve the above mentioned objective, an embodiment filter structure comprises: a main body and a stirring member. The main body is formed substantially from stainless steel plate welded together or is a hot water heater. The main body has a hollow containment space, and a filtering mesh is disposed at a bottom side of the containment space. A first purifying opening is disposed at a top end of the main body, and a second purifying opening is disposed at a lower sidewall position of the main body in the containment space above the filtering mesh and also configured to couple with a seal cap. In addition, the seal cap further comprises a stopping protrusion. Furthermore, a first cleaning opening and a second cleaning opening are separately disposed on the sidewall of the main body. The first cleaning opening is coupled to a first inner pipe extending into the containment space and bent upwardly. The second cleaning opening is disposed below the filtering mesh and coupled to a second inner pipe extending into the containment space and bent downwardly. In addition, an outlet is disposed at the bottom of the main body. The stirring member has an upper cover corresponding to the first purifying opening of the main body. The upper cover further has two opposite corresponding protrusions at its surface and a driving arm and a connecting rod at a center position. The connecting rod is L-shaped and has a rotating diameter smaller than a diameter of the main body. The connecting rod has a plurality of stirring rods, and a length of the stirring rod from the connecting rod is smaller than a diameter of the first purifying opening. The driving arm and the connecting rod are configured to rotate simultaneously.

1. Embodiments of the present invention disclose a filter structure which has multiple layers of filtering material to provide physics and biology filtrate. 2. The main body can be converted from an existing water heater which can reduce costs. 3. The stirring member is configured to perform a reverse cleaning process to the filtering material in the main body.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
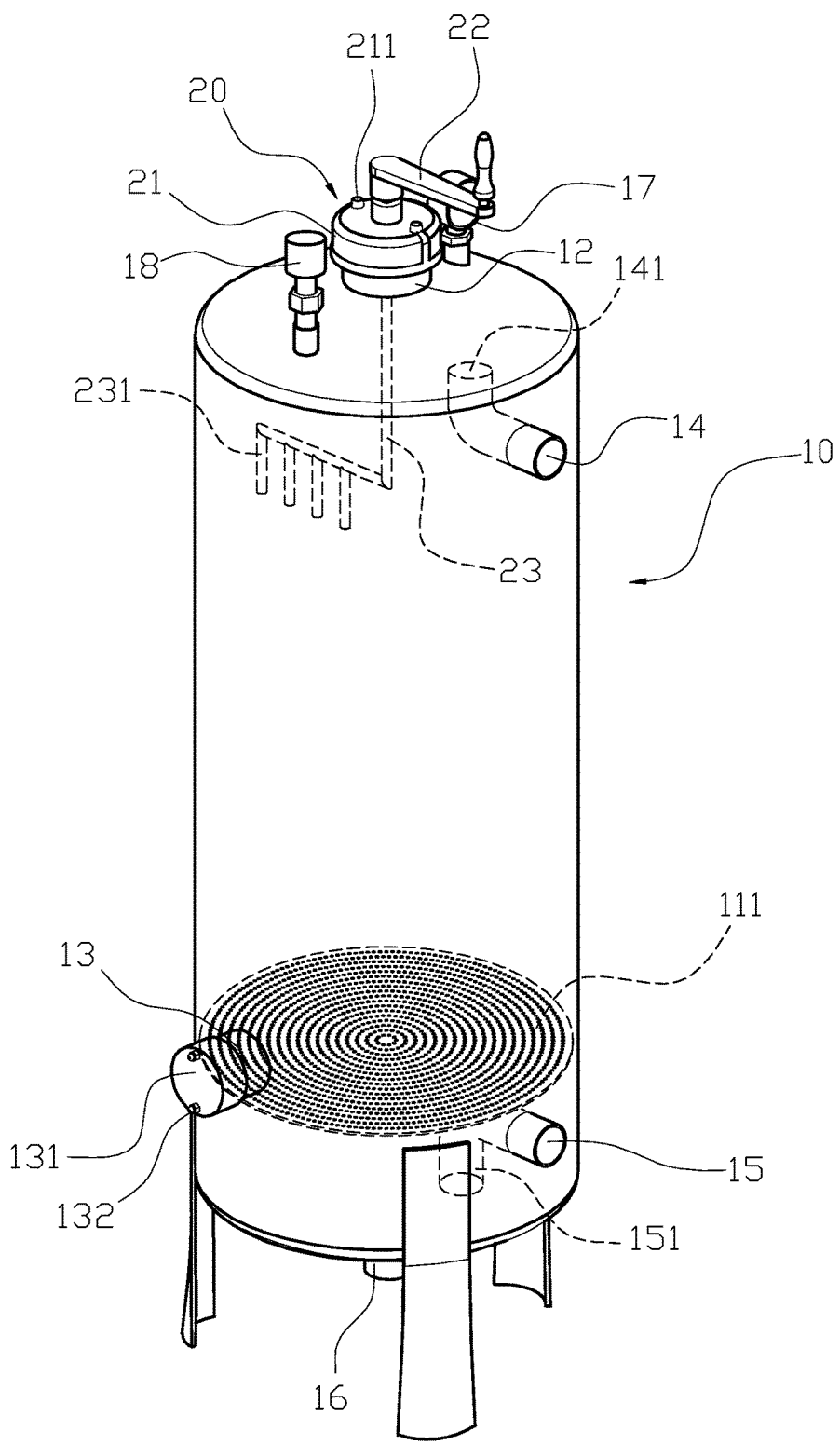
FIG. 1 is a perspective drawing of an embodiment of the present invention.
Figure 2:
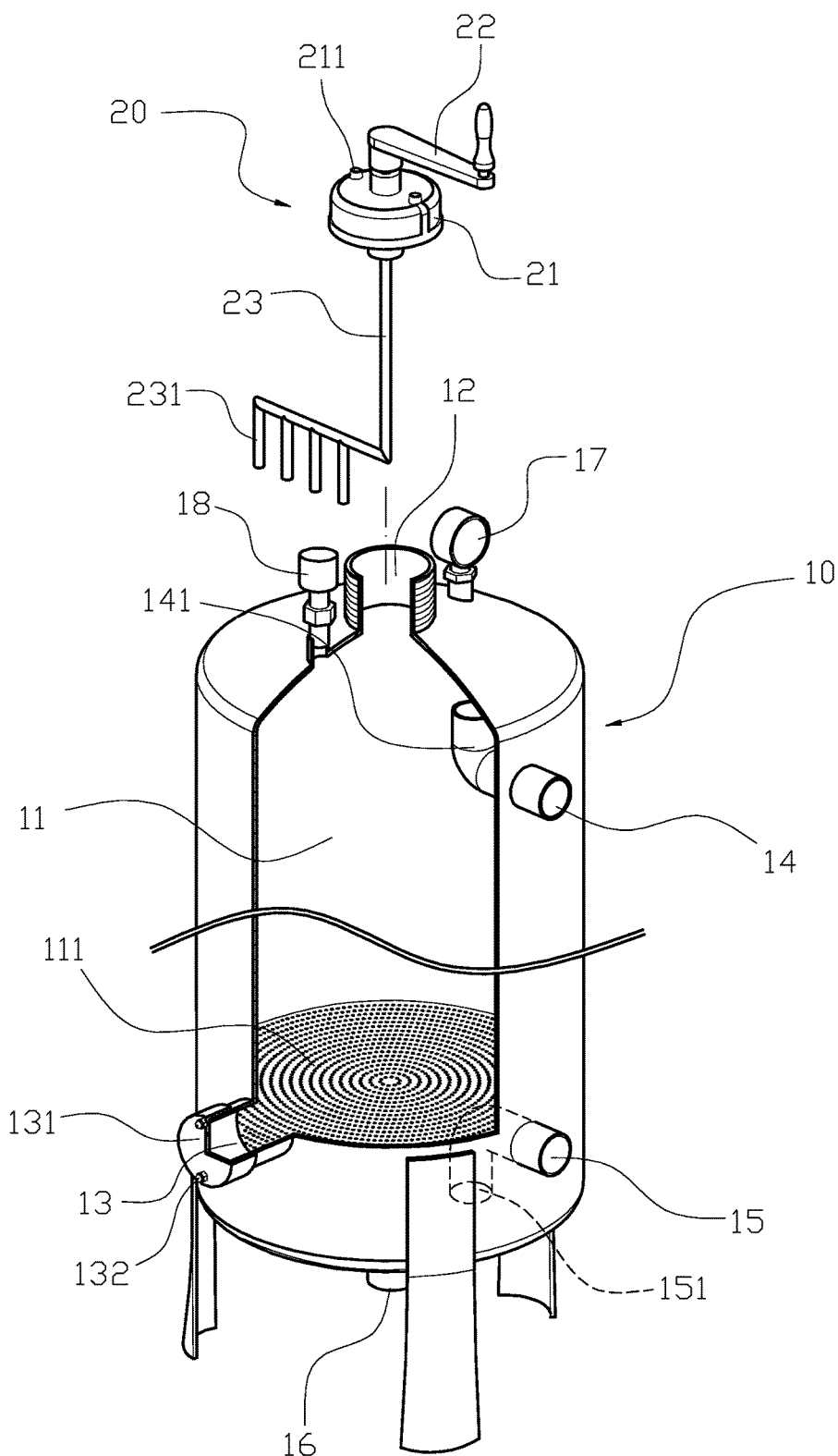
FIG. 2 is an exploded view of the embodiment of the present invention.
Figure 3:
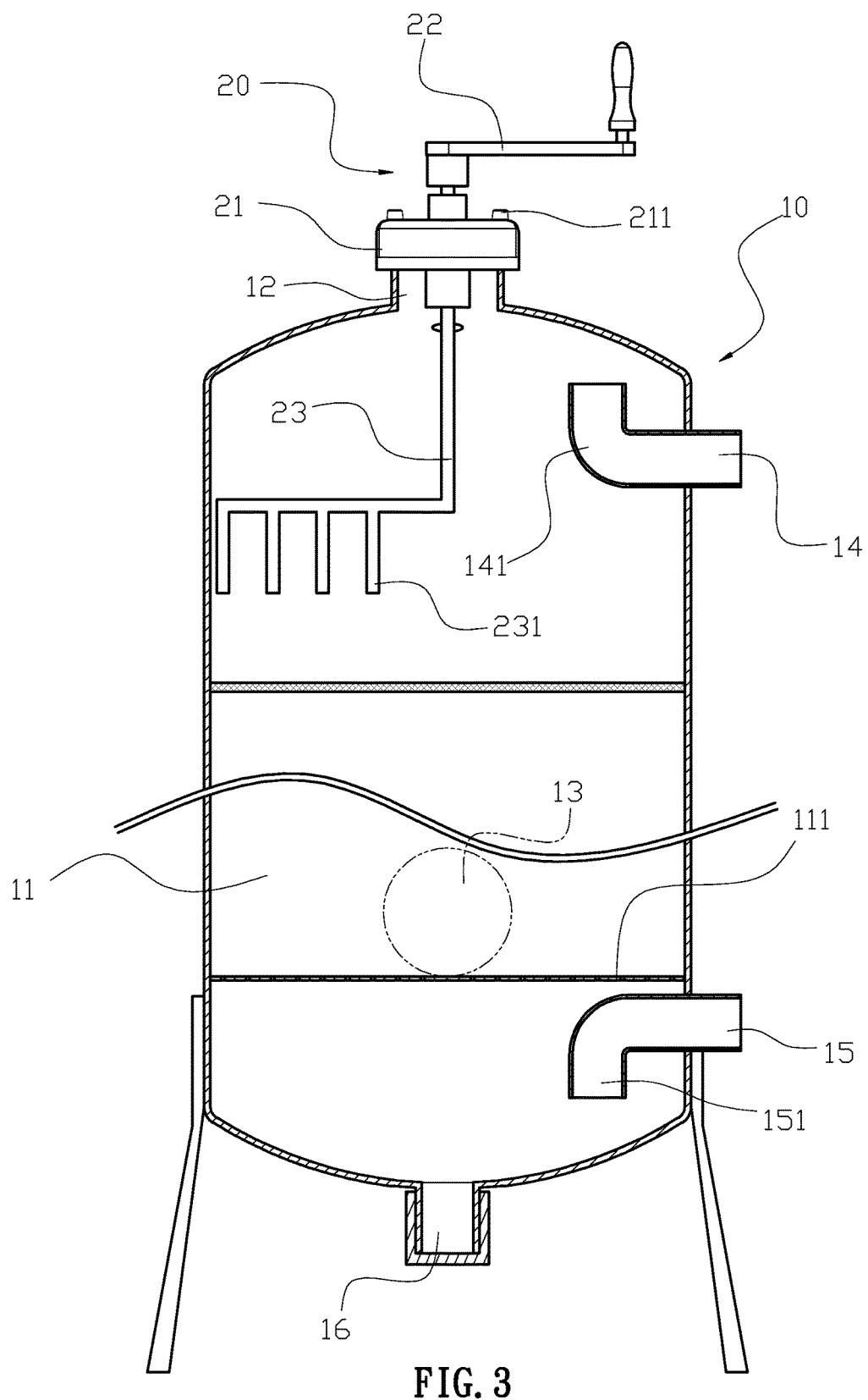
FIG. 3 is a cross-sectional view of the embodiment of the present invention.
Figure 4:
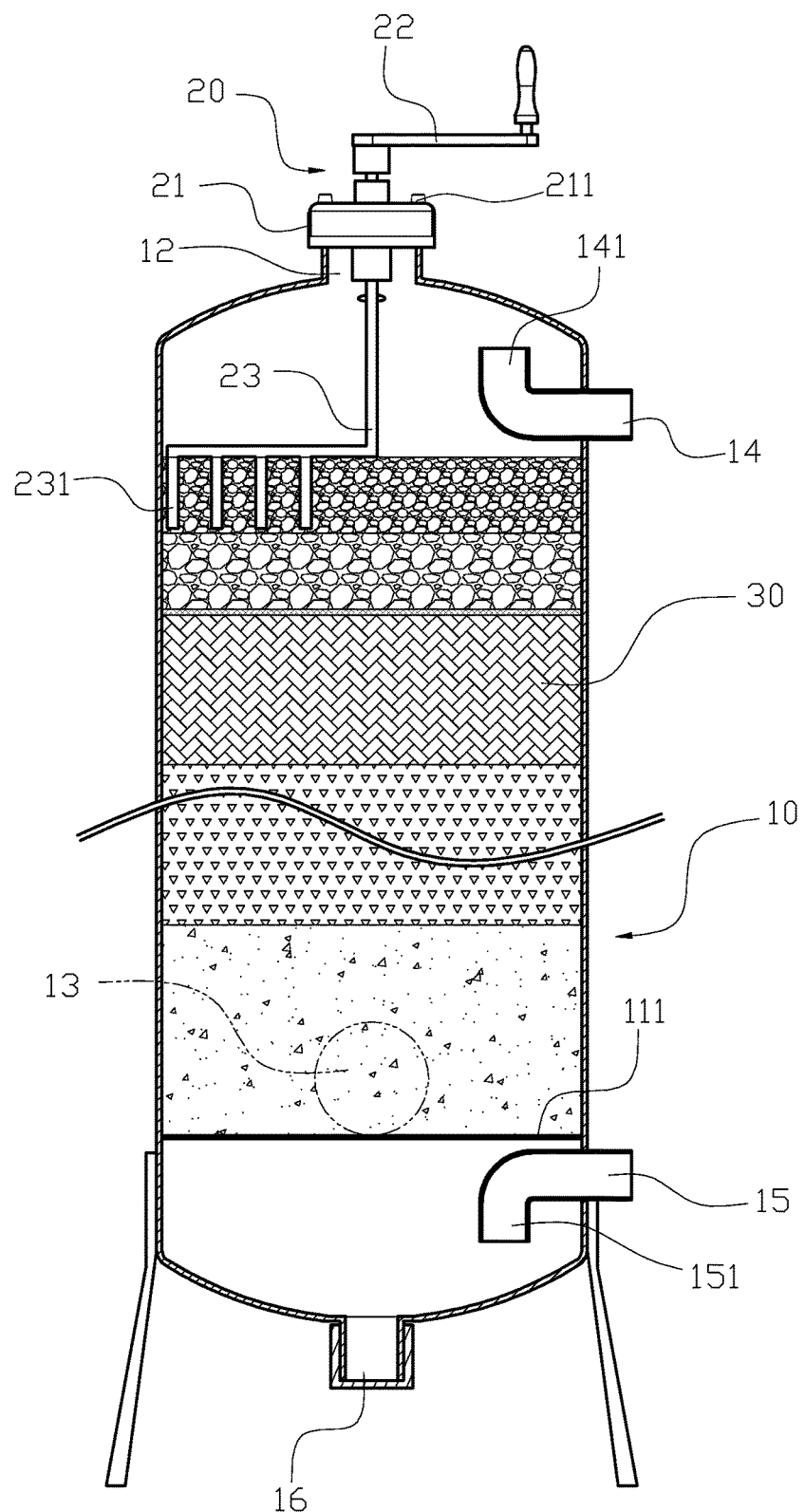
FIG. 4 is a schematic drawing showing a plurality of layers of filtering materials according to the embodiment of the present invention.
Figure 5:
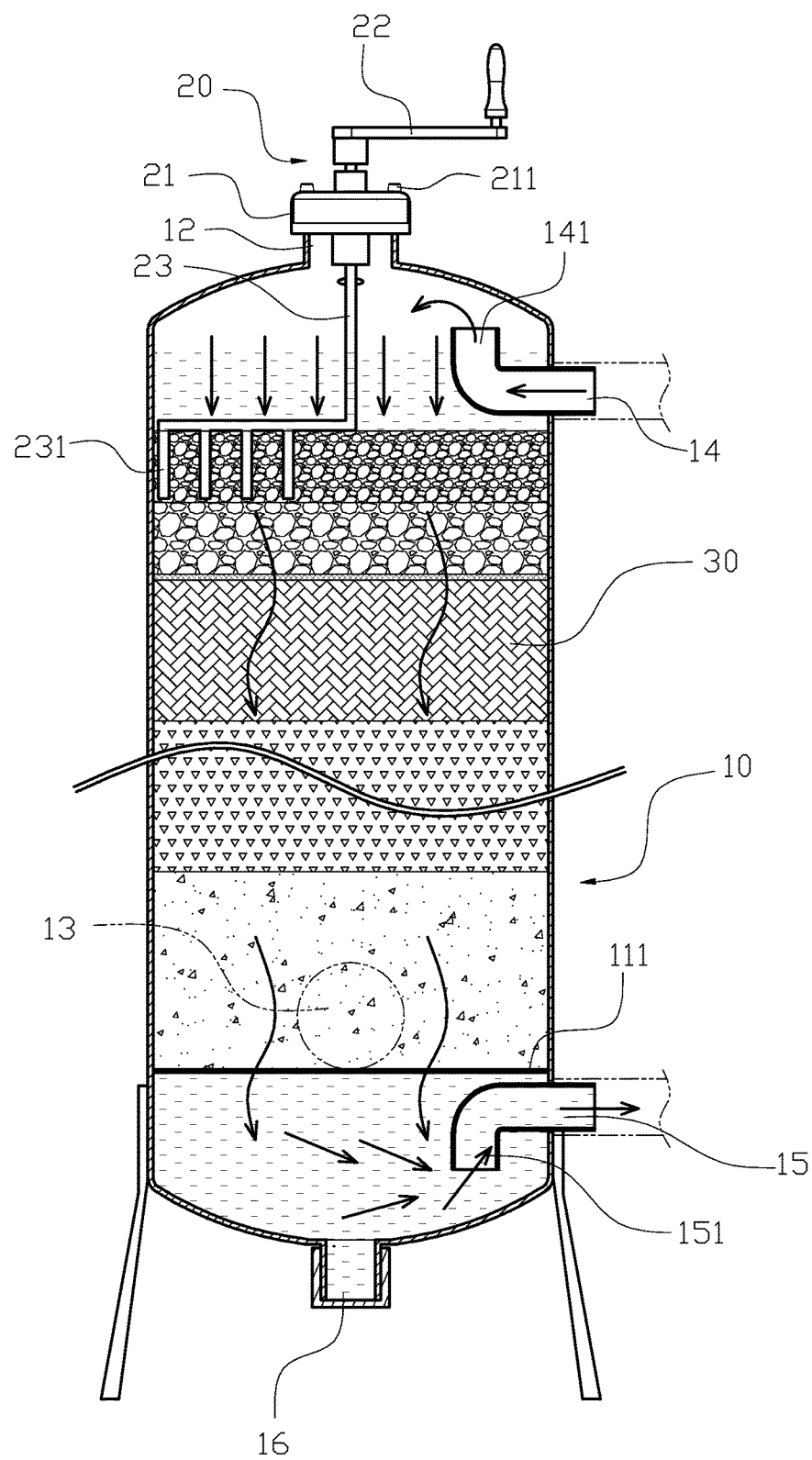
FIG. 5 is a schematic drawing of showing a filtering process according to the embodiment of the present invention.

Please refer to FIG. 1 and FIG. 2. A filter structure comprises: a main body 10 and a stirring member 20. The main body 10 is formed substantially from stainless steel plate welded together or is a hot water heater. The main body 10 has a hollow containment space 11, and a filtering mesh 111 is disposed at a bottom side of the containment space 11. The filtering mesh 111 has a plurality of openings with ⅛ inch diameters. A first purifying opening 12 is disposed at a top end of the main body 10, and a second purifying opening 13 is disposed at a lower sidewall position of the main body 10 in the containment space 11 above the filtering mesh 111 and also configured to couple with a seal cap 131. In addition, the seal cap 131 further comprises a stopping protrusion 132. Furthermore, a first cleaning opening 14 and a second cleaning opening 15 are separately disposed on the sidewall of the main body 10. The first cleaning opening 14 is coupled to a first inner pipe 141 extending into the containment space 11 and bent upwardly. The second cleaning opening 15 is disposed below the filtering mesh 111 and coupled to a second inner pipe 151 extending into the containment space 11 and bent downwardly. In addition, an outlet 16 is disposed at the bottom of the main body 10. The stirring member 20 has an upper cover 21 corresponding to the first purifying opening 12 of the main body 10. The upper cover 21 further has two opposite protrusions 211 at its surface and a driving arm 22 and a connecting rod 23 at a center position. The connecting rod 23 is L-shaped and has a rotating diameter smaller than a diameter of the main body 10. The connecting rod 23 has a plurality of stirring rods 231, and a length of each stirring rod 231 from the connecting rod 23 is smaller than a diameter of the first purifying opening 12. The driving arm 22 and the connecting rod 23 are configured to rotate simultaneously.

For actual assembly and usage, please refer to FIG. 2, FIG. 3, FIG. 4 and FIG. 5. The main body 10 is filled with the filtering material 30 in the containment space 11 via the first purifying opening 12. The filtering material 30 has a plurality of layers of one or more of coarse coral sand, granite, regalite, pumice, another filtering mesh having 20 openings/inch$^2$, rough quartz sand, and fine quartz sand from bottom to the top. A top layer of the filtering material 30 does not cover an opening of the first inner pipe 141 in the containment space 11. The connecting rod 23 of the stirring member 20 is placed through the first purifying opening 12 and locked with the upper cover 21, and the stirring rod 231 of the connecting rod 23 is placed below the first inner pipe 141 and covered by the top layer of the filtering material 30. The first cleaning opening 14 and the second cleaning opening 15 of the main body 10 are respectively connected to an input pipe and an output pipe of a water cycling system. When water is water is driven by the motor and supplied into the containment space 11 through the first cleaning opening 14 to pass through the plurality of layers of the filtering material 30 then exit from the second cleaning opening 15 to go back to a water cycling system.

Figure 6:
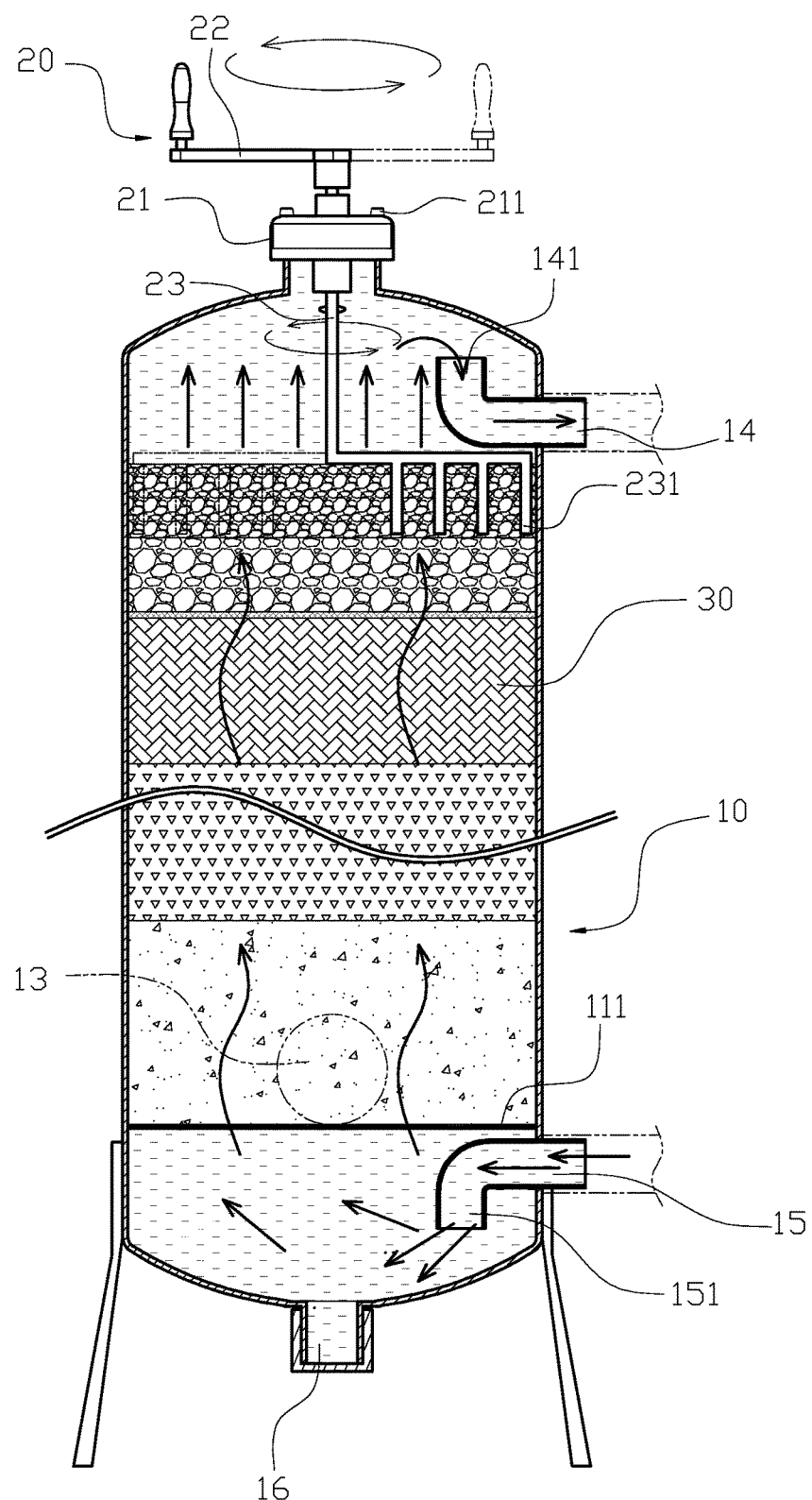
FIG. 6 is a schematic drawing of showing a reverse cleaning process according to the embodiment of the present invention.

Furthermore, the main body 10 has a pressure meter 17 and a releasing valve 18 to balance the pressure in the containment space 11. When the pressure is too high, it indicates the filtering material 30 it suffers from built-up impurities, which cause high water pressure. Therefore, it is necessary to release the pressure and perform a reverse cleaning process. Please refer to FIG. 6 with FIG. 2. When a user need to start the reverse cleaning process, water is driven by the motor and enters into the containment space 11 via the second cleaning opening 15, through the second inner pipe 151 to flash the bottom of the main body and splash up to wash the filtering material 30. Furthermore, in order to clean and unclog the upper layers of the filtering material 30, the user needs to rotate the driving arm 22 of the stirring member 20 to drive the stirring rod 231 of the connecting rod 23 to loosen up the upper layer of the filtering material 30 in order to let water to wash through. Then the water exits from the first inner pipe 141 of the containment space 11 through the first cleaning opening 14.

Figure 7:
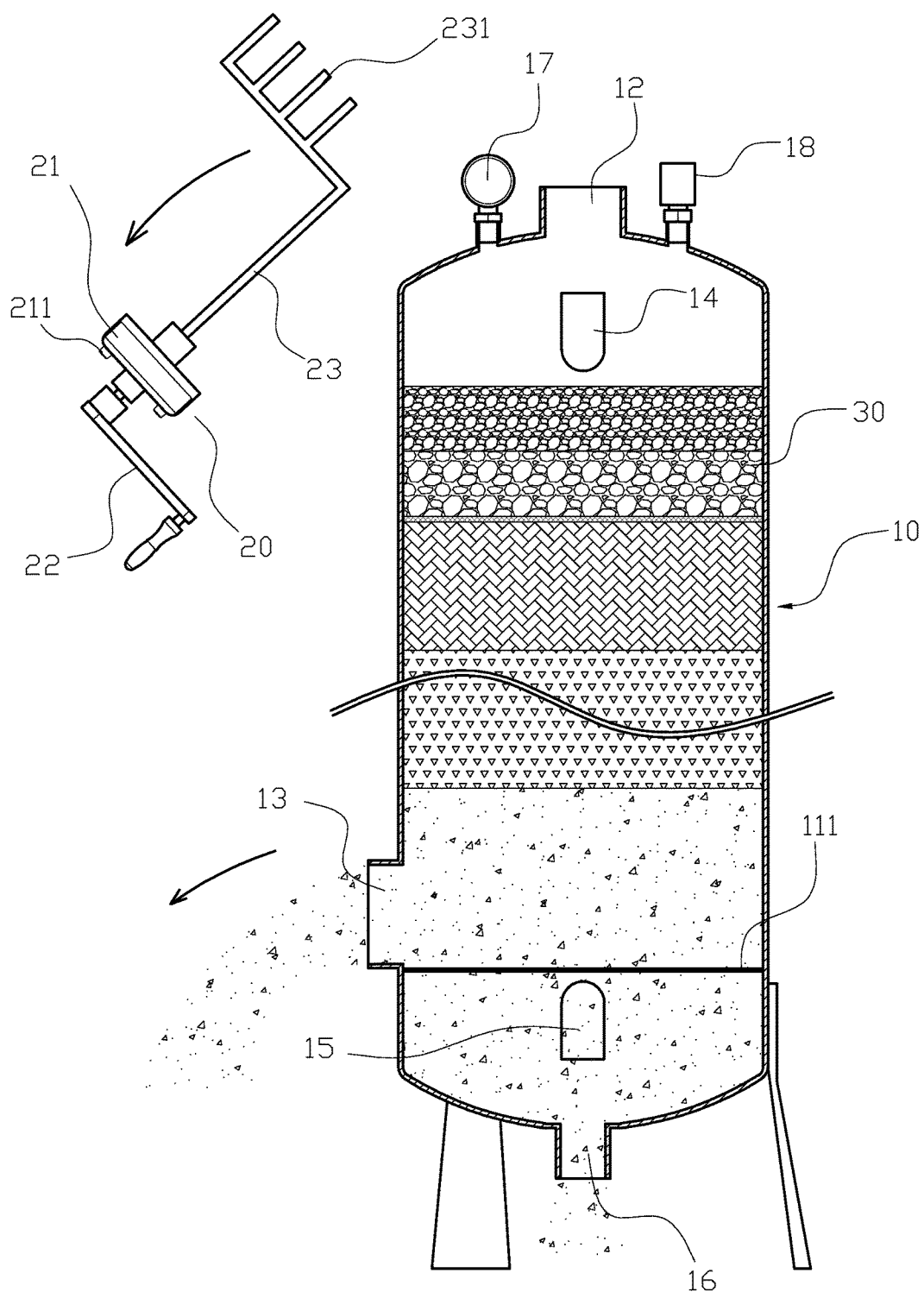
FIG. 7 is a schematic drawing of showing changing the filtering materials according to the embodiment of the present invention.

Please refer to FIG. 7. When the filtering material 30 in the main body 10 needs to be changed, the stirring member 20 is first removed out from the first purifying opening 12; a bar is placed between the two opposite corresponding protrusions 211 and used as a handle to open the upper cover 21; then the seal cap 131 of the second purifying opening 13 is opened by placing another rod between the two opposite stopping protrusions 132 of the seal cap 131 and used as a handle to open the seal cap 131. Also, the outlet 16 of the main body 10 can be opened too, to completely empty the containment space 11.

With the above-mentioned structure, the following benefits can be obtained: 1. Embodiments of the present invention provide a filter structure which has multiple layers of filtering material 30 to provide a physical and biological filtering. 2. The main body 10 can be converted from an existing water heater, which can reduce costs. 3. The stirring member 20 is configured to perform a reverse cleaning process to the filtering material 30 in the main body 10.

Although the present invention has been explained in relation to its preferred embodiment, it is to be understood that many other possible modifications and variations can be made without departing from the spirit and scope of the invention as hereinafter claimed.

What is claimed is:
1. A filter structure comprising:
   a main body having a hollow containment space filled with a filtering material, a filtering mesh disposed at a bottom side of the containment space, a first purifying opening disposed at a top end of the main body;
   a second purifying opening disposed at a lower sidewall position of the main body in the containment space and above the filtering mesh, and also configured to couple with a seal cap;
   a first cleaning opening and a second cleaning opening disposed on the main body, the first cleaning opening coupled to a first inner pipe extending into the containment space and bent upwardly, the second cleaning opening disposed below the filtering mesh and coupled to a second inner pipe extending into the containment space and bent downwardly;
   an outlet disposed at a bottom of the main body; and
   a stirring member having an upper cover corresponding to the first purifying opening of the main body, the upper cover further having a driving arm and a connecting rod, the connecting rod having a plurality of stirring rods;
   wherein the driving arm and the connecting rod are configured to rotate simultaneously.

2. The filter structure as claimed in claim 1, wherein the main body is formed substantially from stainless steel plate welded together.

3. The filter structure as claimed in claim 1, wherein the main body is a hot water heater.

4. The filter structure as claimed in claim 1, wherein the filtering mesh has a plurality of openings with a ⅛ in diameter.

5. The filter structure as claimed in claim 1, wherein the connecting rod is L-shaped and has a rotating diameter smaller than a diameter of the main body.

6. The filter structure as claimed in claim 1, wherein a length of the stirring rod from the connecting rod is smaller than a diameter of the first purifying opening.

7. The filter structure as claimed in claim 1, wherein the filtering material comprises a plurality of layers of one or more of coarse coral sand, granite, regalite, pumice, another filtering mesh with 20 openings/inch$^2$, rough quartz sand, and fine quartz sand from bottom to the top, and wherein a top layer of the filtering material does not cover an opening of the first inner pipe in the containment space.

8. The filter structure as claimed in claim 1, wherein the connecting rod of the stirring member is placed through the first purifying opening and locked with the upper cover, and the stirring rod of the connecting rod is placed below the first inner pipe and covered by the top layer of the filtering material.

9. The filter structure as claimed in claim 1, wherein the main body further comprises a pressure meter and a releasing valve.

10. The filter structure as claimed in claim 1, wherein the seal cap for the second purifying opening further comprises a stopping protrusion, and the upper cover of the stirring member further comprises two opposite corresponding protrusions.

* * * * *